United States Patent
Crichton et al.

(10) Patent No.: US 10,729,293 B2
(45) Date of Patent: Aug. 4, 2020

(54) DEBRIS BLOWER INCORPORATING FLOW EJECTOR

(71) Applicant: THE TORO COMPANY, Bloomington, MN (US)

(72) Inventors: Daniel Crichton, Cambridge (GB); LaVern L. Ackerman, Eagan, MN (US); Paul F. Koltz, Excelsior, MN (US)

(73) Assignee: THE TORO COMPANY, Bloomington, MN (US)

( * ) Notice: Subject to any disclaimer, the term of this patent is extended or adjusted under 35 U.S.C. 154(b) by 114 days.

(21) Appl. No.: 15/884,733

(22) Filed: Jan. 31, 2018

(65) Prior Publication Data

US 2018/0228326 A1    Aug. 16, 2018

Related U.S. Application Data

(60) Provisional application No. 62/459,170, filed on Feb. 15, 2017.

(51) Int. Cl.
   *A47L 5/14*      (2006.01)
   *A01G 20/47*    (2018.01)
   *B08B 5/02*      (2006.01)

(52) U.S. Cl.
   CPC .............. *A47L 5/14* (2013.01); *A01G 20/47* (2018.02); *B08B 5/02* (2013.01)

(58) Field of Classification Search
   CPC .............. A47L 5/14; A01G 20/47; B08B 5/02
   See application file for complete search history.

(56) References Cited

U.S. PATENT DOCUMENTS

| | | | |
|---|---|---|---|
| 5,333,787 | A | 8/1994 | Smith et al. |
| 5,950,276 | A | 9/1999 | Everts et al. |
| 6,003,199 | A | 12/1999 | Shaffer |
| 6,076,231 | A | 6/2000 | Bucher |
| 6,442,790 | B1 | 9/2002 | Svoboda et al. |
| 6,708,715 | B2 | 3/2004 | Duebel et al. |
| 6,851,936 | B2 | 2/2005 | Stingel et al. |

(Continued)

FOREIGN PATENT DOCUMENTS

| | | |
|---|---|---|
| FR | 2281543 A2 | 3/1976 |
| GB | 2484695 A | 4/2012 |
| JP | H07-110000 A | 4/1995 |

OTHER PUBLICATIONS

"240 MPH Blower Vacuum, Model # BV3800," including two enlarged images at p. 4 [online], Black and Decker Inc. [retrieved on Mar. 18, 2015]. Retrieved from the Internet: <URL: http://www.blackanddecker.com/outdoor/BV3800.aspx>. BV3800 product believed to be available at least as early as Feb. 28, 2013; 4 pages.

(Continued)

*Primary Examiner* — Andrew A Horton
(74) *Attorney, Agent, or Firm* — Mueting, Raasch & Gebhardt, P.A.

(57) ABSTRACT

A hand-held debris blower including a blower tube and an associated ejector. The blower includes an airflow generator adapted to generate a primary airflow that is directed into a blower tube. A flow ejector is operable to selectively increase a working airflow provided by the blower by selectively entraining a secondary airflow within the primary airflow.

10 Claims, 14 Drawing Sheets

(56) References Cited

U.S. PATENT DOCUMENTS

| | | | |
|---|---|---|---|
| 6,928,693 B1* | 8/2005 | Ericson | A01G 20/47 15/405 |
| D597,715 S | 8/2009 | Barker | |
| 7,621,463 B2 | 11/2009 | Presz, Jr. et al. | |
| 7,735,188 B2 | 6/2010 | Shaffer | |
| 8,678,776 B2 | 3/2014 | Medow et al. | |
| 9,127,855 B2 | 9/2015 | Staniforth et al. | |
| 9,420,924 B2 | 8/2016 | Svoboda et al. | |
| 2006/0027679 A1 | 2/2006 | Gratteau | |
| 2010/0150699 A1 | 6/2010 | Nicolas et al. | |
| 2013/0047371 A1* | 2/2013 | Namekata | A01G 20/47 15/414 |
| 2014/0299672 A1 | 10/2014 | Gopalan et al. | |
| 2015/0044040 A1 | 2/2015 | Oda et al. | |
| 2016/0166035 A1 | 6/2016 | Douglas et al. | |

OTHER PUBLICATIONS

Daniel Crichton, Ph.D. Thesis, "Fan Design and Operation for Ultra Low Noise" University of Cambridge, Department of Engineering. 2007; 255 pages.

Ego, "Power Blower 56V-Volt Lithium-Ion Cordless Blower, Model No. LB4800" Operating Manual, Grand Rapids, MI, Date Unknown; 136 pages.

Ego, "Power Blower 56-Volt Lithium-Ion Cordless Blower, Model No. LB5300/LB5300-FC" Operator's Manual, Grand Rapids, MI, Date Unknown; 72 pages.

Festo, "Vacuum Generators" Catalog. Festo Corporation, Hauppauge, NY. Copyright 2008; 50 pages.

"FloDesign" article, [online], Massachusetts Small Business Development Center Network [retrieved on Feb. 12, 2019]. Retrieved from the Internet: <URL: https://web.archive.org/web/20150930073745/https://www.msbdc.org/flodesign.html>. Website believed to be available at least as early as Sep. 30, 2015; 2 pages.

Pellenc s.a., "Airion 2 Blower" User Guide, Pertuis, France, Jan. 2016; 20 pages.

Ryobi "Operator's Manual, 42cc Backpack Blower, RY08420," Rev:05, Techtronic Industries North America, Inc., Anderson, SC. Aug. 12, 2013; 38 pages.

Ryobi "Operator's Manual, Blower, RY09466A," Rev:01, Techtronic Industries Power Equipment, Anderson, SC. May 12, 2015; 44 pages.

Ryobi "Operator's Manual, Electric Blower, RY42102," Rev:01, Techtronic Industries Power Equipment, Anderson, SC. Sep. 1, 2015; 34 pages.

Ryobi "Operator's Manual, Jet Fan Blower, RY25AXB," Rev:02, Techtronic Industries Power Equipment, Anderson, SC. Jun. 22, 2017; 42 pages.

Pro Tool Reviews, "Ryobi 40V Jet Fan Blower Review" written by Kenny Koehler, [online]. [retrieved on Dec. 22, 2018]. Retrieved from the Internet: <URL: https://www.protoolreviews.com/tools/outdoor-equipment/ryobi-40v-jet-fan-blower-review/31066/>. Sep. 22, 2017; 20 pages.

Stihl, "Stihl BGA 85" Instruction Manual, Stihl Inc., Virginia Beach, VA. 2013; 60 pages.

Toro "Power Sweep Blower, Model No. 51585—Serial No. 280000001 and Up," Operator's Manual. Form No. 3358-870 Rev B, The Toro Company, Bloomington, MN. Copyright 2009; 8 pages.

Toro "Rake and Vac™ and Super Blower/Vacuum, Model No. 51617—Serial No. 313000001 and Up, Model No. 51618—Serial No. 313000001 and Up," Operator's Manual. Form No. 3379-372 Rev A, The Toro Company, Bloomington, MN. Copyright 2013; 16 pages.

Toro "Ultra Blower/Vacuum, Model No. 51619—Serial No. 314000001 and Up," Operator's Manual. Form No. 3394-167 Rev A, The Toro Company, Bloomington, MN. Copyright 2014; 24 pages.

Toro "UltraPlus Blower/Vacuum, Model No. 51621—Serial No. 314000001 and Up," Operator's Manual. Form No. 3390-837 Rev A, The Toro Company, Bloomington, MN. Copyright 2014; 24 pages.

Gardening Products Review, "Troy-Bilt JET Gas Leaf Blower (TB2MB): Product Review" written by Monica Hemingway [online]. [retrieved on Dec. 22, 2018]. Retrieved from the Internet: < URL: https://gardeningproductsreview.com/troy-bilt-jet-gas-leaf-blower-tb2mb-review/>. Nov. 14, 2015; 36 pages.

Chhabra, Vaibhav, "Toroidal Vortex Leaf Blower," including one enlarged image at p. 2 [online]. [Retrieved on Mar. 18, 2015]. Retrieved from the Internet: <URL: https://vaibhavdesign.wordpress.com/toroidal-vortex-leaf-blower/>. Website believed to be available at least as early as Mar. 18, 2013; 2 pages.

Worx, "7.5A Electric Blower, Model Nos. WG516 and WG517" Operator's Manual. Positec. Copyright 2015; 20 pages.

Worx, "12A Electric Blower, Model No. WG520" Operator's Manual. Positec. Copyright 2015; 20 pages.

* cited by examiner

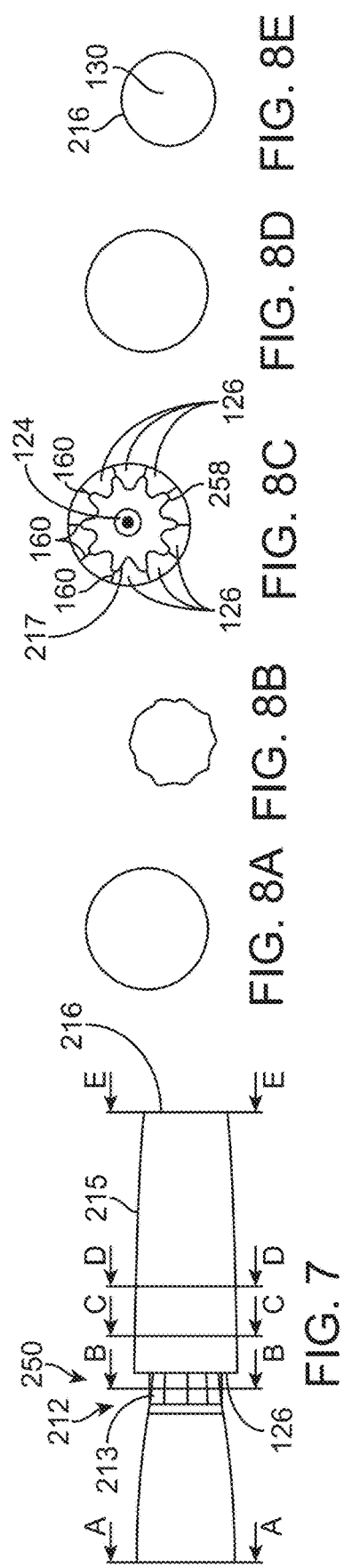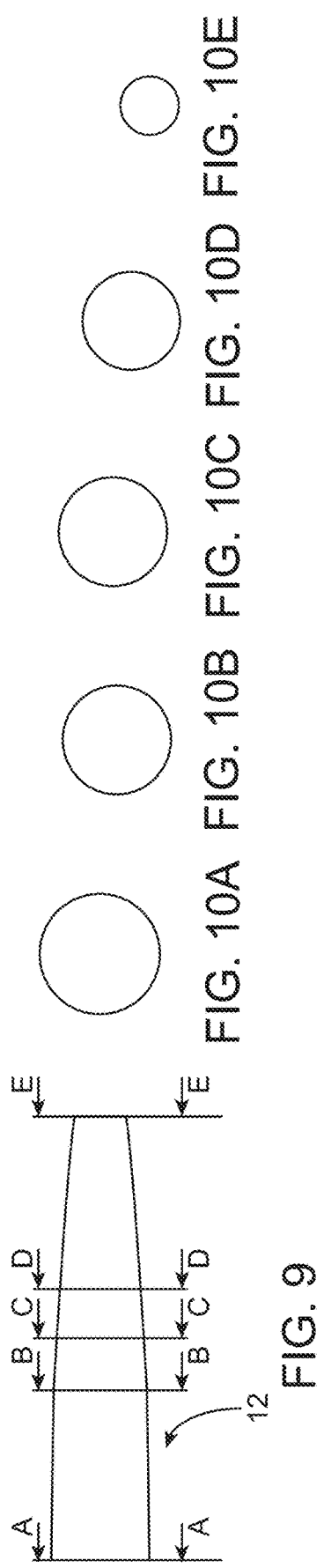

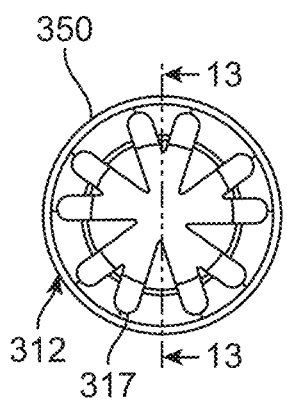
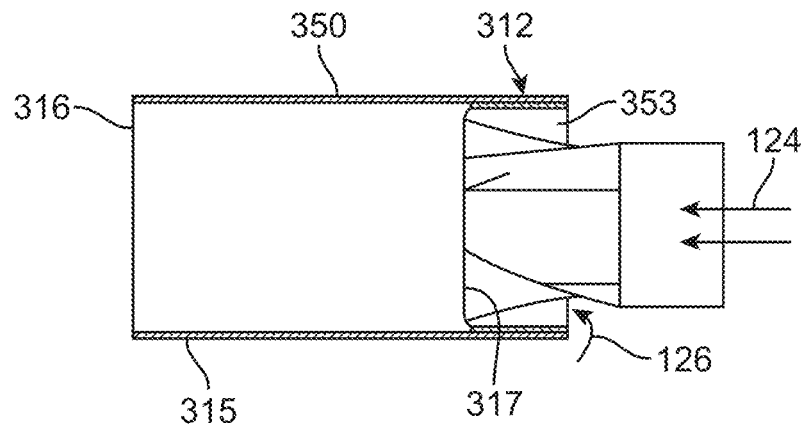
FIG. 12　　　　　FIG. 13
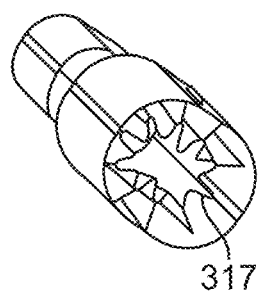
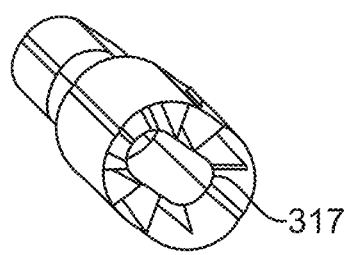
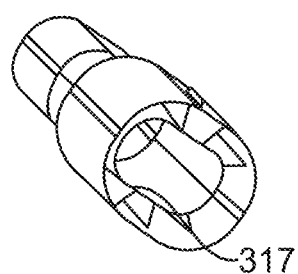
FIG. 14A　　　FIG. 14B　　　FIG. 14C
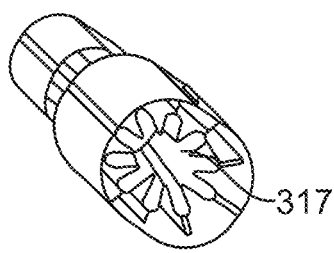
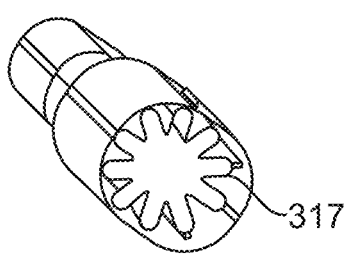
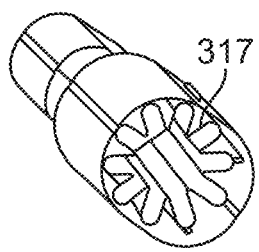
FIG. 14D　　　FIG. 14E　　　FIG. 14F

DEBRIS BLOWER INCORPORATING FLOW EJECTOR

This application claims the benefit of U.S. Provisional Application No. 62/459,170, filed Feb. 15, 2017, which is incorporated herein by reference in its entirety.

Embodiments of the present disclosure are directed to debris blowers and, more particularly, to a flow ejector adapted to provide a debris blower with two or more volumetric airflow settings.

BACKGROUND

Handheld debris blowers are commonly used by homeowners and professionals alike for the removal of debris from outdoor surfaces such as yards, driveways, sidewalks, etc. Typically, debris blowers draw air into a blower housing through an air inlet and exhaust an accelerated air stream through an air outlet. The air stream is then channeled through a blower tube attached to the air outlet, wherein the blower tube may then be directed at the surface to be cleaned.

Because many blowers are designed for hand-held use, they are often made of lightweight materials. Although more powerful blowers may utilize a gasoline-powered engine to provide power, many lightweight consumer-oriented blowers utilize small electric (battery or corded) motors as the power source.

Although size and weight are criteria to consider in the selection of a blower motor, available power is also a factor. For example, a typical blower may be designed to draw, as maximum input power, about 1440 Watts (120-volt AC, 15-amp circuit at 80% load). With this as one constraint, manufacturers may design a debris blower to provide the desired output air stream characteristics.

Typically, debris blowers are designed to provide either: high volumetric flow rate (e.g., for moving larger masses of debris); or high air stream velocity (e.g., for dislodging/ loosening debris). However, for a blower to meet both of these competing performance goals typically necessitates providing a blower with multiple and interchangeable blower tubes and/or blower nozzles.

SUMMARY

Embodiments described herein may provide a handheld lawn debris blower comprising: a housing defining an air outlet, wherein the housing is adapted to produce a primary airflow at the air outlet; and a blower tube comprising an upstream end coupled to the air outlet, and a downstream end, the downstream end defining a blower outlet adapted to deliver a working airflow. An ejector is also provided and associated with the blower tube or the housing, the ejector defining a flow augmenting inlet, wherein the ejector is adapted to be configured in either: a closed configuration, wherein the flow augmenting inlet is effectively closed such that the working airflow is approximately equal to the primary airflow; and an open configuration, wherein the flow augmenting inlet is open such that a secondary airflow is introduced into the ejector, via the augmenting inlet, and mixed with the primary airflow to effectively increase the working airflow.

In another embodiment, a handheld lawn debris blower is provided that includes: a housing defining an air outlet; an airflow generator adapted to produce a primary airflow that is exhausted through the air outlet; and a blower tube comprising an upstream end coupled to the air outlet, and a blower outlet formed at a downstream end, wherein the blower provides a working airflow at the blower outlet. An ejector is also provided at or near the downstream end of the blower tube, wherein the ejector includes a mixing portion movable between: a closed position, wherein a flow augmenting inlet associated with the ejector is effectively closed such that the working airflow is approximately equal to the primary airflow; and an open position, wherein the flow augmenting inlet is effectively open such that a secondary airflow is introduced into the ejector, via the flow augmenting inlet, and mixed with the primary airflow such that the working airflow is greater than the primary airflow.

In still another embodiment, a blower tube for use with a handheld lawn debris blower is provided, wherein the blower tube includes: an upstream end defining an inlet adapted to receive a primary airflow provided by the blower; and a downstream end defining a blower outlet adapted to direct a working airflow provided by the blower. An ejector is also provided and defines a flow augmenting inlet positioned upstream of the blower outlet. The ejector is movable between: a closed configuration, wherein the flow augmenting inlet is effectively closed such that the working airflow is approximately equal to the primary airflow; and an open configuration, wherein the flow augmenting inlet is effectively open such that a secondary airflow is introduced into the blower tube, via the flow augmenting inlet, and mixed with the primary airflow such that the working airflow is greater than the primary airflow.

In yet another embodiment, a handheld lawn debris blower is provided that includes: a housing defining an air outlet, wherein the housing is adapted to produce a primary airflow at the air outlet; and a blower tube comprising an upstream end coupled to the air outlet, and a downstream end, the downstream end defining a blower outlet adapted to deliver a working airflow. The blower also includes an ejector associated with the blower tube or the housing, wherein the ejector is adapted to be configured in either: a closed configuration, wherein the blower outlet defines a first area; and an open configuration, wherein the blower outlet defines a second area different that the first area.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein:

FIG. 7 is a side elevation view of a blower tube and flow ejector in accordance with still another embodiment of the disclosure, the ejector shown in an open configuration;

FIGS. 8A-8E are section views taken at corresponding sections shown in FIG. 7;

FIG. 9 is a side elevation view of a conventional blower tube (with no ejector);

FIGS. 10A-10E are section views taken at corresponding sections shown in FIG. 9;

FIG. 12 is an end view of an ejector in accordance with another embodiment of this disclosure;

FIG. 13 is a section view taken along line 13-13 of FIG. 12;

FIGS. 14A-14F illustrate partial views of alternative ejectors, wherein each view illustrates a different geometry that may be substituted for the ejector geometry shown in FIG. 3;

FIGS. 23A-23B illustrate partial cutaway perspective views of a blower tube and flow ejector in accordance with another embodiment of the present disclosure, wherein: FIG. 23A illustrates the ejector in a closed configuration (ejector "off"); and FIG. 23B illustrates the ejector in an open configuration (ejector "on").

Figure 1A:
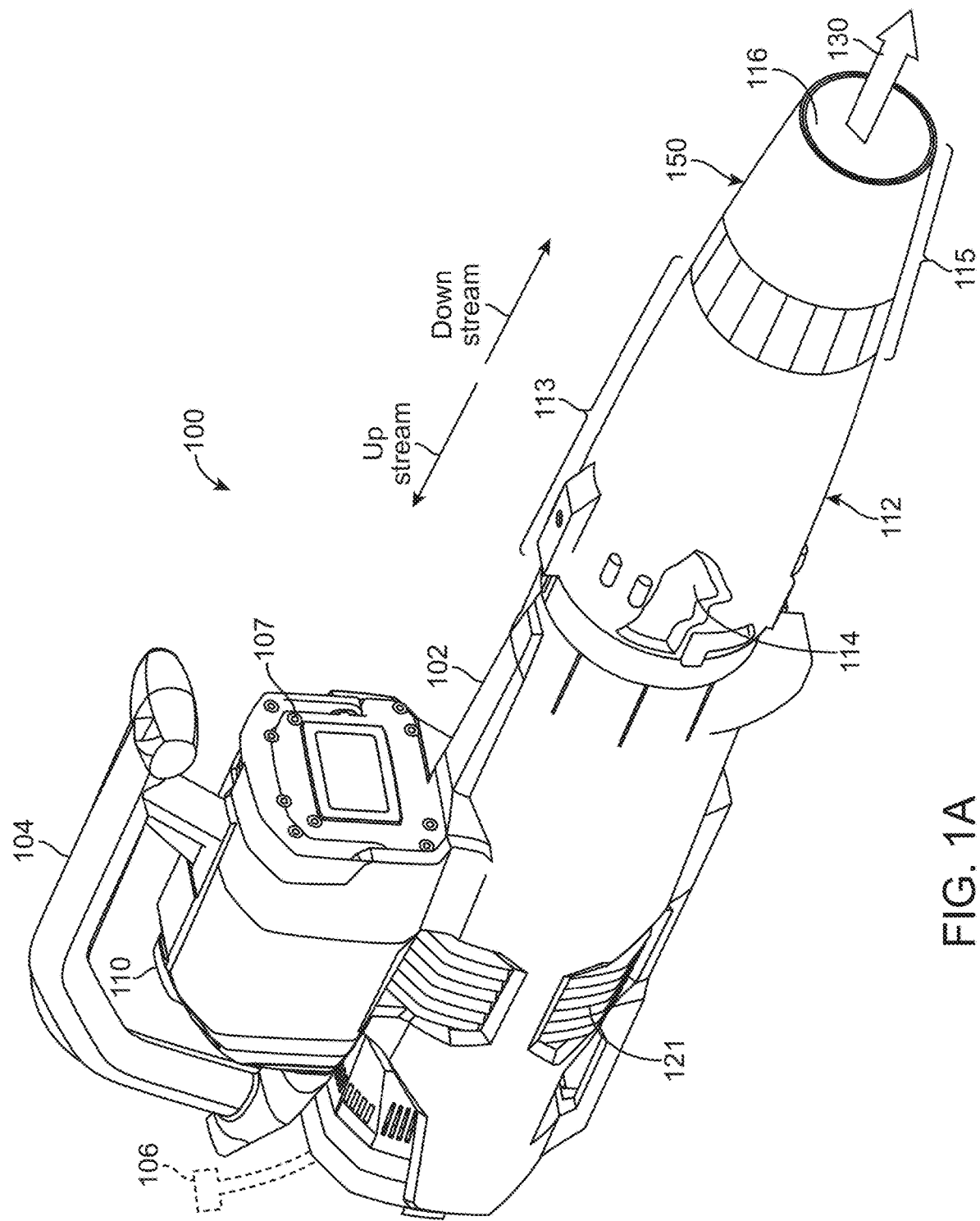
FIG. 1A illustrates an exemplary axial fan debris blower, the blower including a blower tube and flow ejector in accordance with embodiments of the present disclosure.

The figures are rendered primarily for clarity and, thus, are not necessarily drawn to scale. Moreover, various structure/components, including but not limited to fasteners, electrical components (wiring, cables, etc.), and the like, may be shown diagrammatically or removed from some or all the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way. Still further, "Figure x" and "FIG. x" may be used interchangeably herein to refer to the figure numbered "x."

DETAILED DESCRIPTION OF EXEMPLARY EMBODIMENTS

In the following detailed description of illustrative embodiments, reference is made to the accompanying figures of the drawing which form a part hereof. It is to be understood that other embodiments, which may not be described and/or illustrated herein, are certainly contemplated.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "about."

It is noted that the terms "comprises" and variations thereof do not have a limiting meaning where these terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective shown in the referenced figure (unless otherwise noted). These terms are used only to simplify the description, however, and not to limit the interpretation of any embodiment described.

Embodiments of the present disclosure may relate to portable, hand-held debris blowers commonly used to clear debris from outdoor surfaces via the production of a fast-moving stream of air ("working airflow") typically generated by a fan or impeller located within the blower. Such blowers may include a flow ejector that may, in some embodiments, be at or near a downstream end of a blower tube. The ejector may be set to either a closed configuration (ejector "off") or an open configuration (ejector "on"). In the closed configuration, the blower may produce a high-speed working airflow (for a given motor input power) useful for dislodging or loosening debris such as wet leaves from the outdoor surface. Alternatively, when the ejector is moved to the open configuration, the blower may provide an increased working airflow rate by drawing in ambient air and mixing/combining it with the flow produced by the fan/impeller. When the ejector is in the open configuration, the blower may thus provide a higher flow rate (for a given motor input power), which may offer more productive blower operation as the mass-augmented air stream may extend farther from the blower nozzle and cover a wider work area.

As one can thus appreciate, blowers in accordance with embodiments of this disclosure may, based upon a given electrical input power, offer both a blower setting that provides increased airflow (with the ejector on), and a blower setting that provides lower airflow (with the ejector off), but at a higher air pressure/velocity, when needed. These benefits may be realized without the need for multiple blower tubes and/or blower nozzles.

While not wishing to be bound to any specific embodiment, flow ejectors in accordance with embodiments of the present disclosure may be configured as an integral part of the blower tube, or as a separate component attachable to the blower tube, e.g., to the downstream end of the blower tube. Other embodiments may alternatively locate the ejector within a housing of the blower itself, i.e., upstream of the blower tube.

With reference to the figures of the drawing, wherein like reference numerals designate like parts and assemblies throughout the several views, FIG. 1A is a perspective view of a portable, electric debris blower 100 in accordance with one embodiment of the disclosure. While the blower 100 is illustrated as a dedicated blower (also referred to herein simply as "blower"), embodiments of the present disclosure may also find application to debris blowers that are convertible to debris vacuums. An example of the latter (also referred to herein as "blower" or "blower/vac") is the UltraPlus Blower Vac (model 51621) manufactured by The Toro Company of Bloomington, Minn., USA and illustrated in, for example, FIG. 2. Moreover, those skilled in the art will appreciate that most any type of blower, e.g., gas-engine powered units and electrically powered units (e.g. corded or battery), may benefit from the exemplary concepts provided herein.

The exemplary blower 100 shown in FIG. 1A is configured as an axial fan blower. It may include a blower housing 102 having one or more handles 104 adapted for gripping by an operator during use. The housing 102 may further include a power cord 106 for receiving external AC power. In addition or instead of the power cord 106, the blower 100 may receive power from an onboard power source such as a battery 107.

To selectively control delivery of electrical power to a motor 108 (see FIG. 1B) contained within the housing 102, a control 110 may be provided. In one embodiment, the control 110 is coupled, e.g., in series, between the power cord 106 (or battery 107) and the motor 108. The control 110 may merely open or close a power delivery circuit or, alternatively, may function as a potentiometer that varies power to the motor 108 to provide adjustable motor speed.

The blower 100 may further include a blower tube 112 attached to and extending outwardly from the housing 102. The blower tube 112 may have an upstream or proximal end defining an inlet that permits the blower tube to be fluidly and removably coupled to an air outlet 114 of the housing 102. The blower tube 112 may extend from the proximal end to a blower outlet 116 formed at a downstream or distal end of the blower tube. For purposes of this description, the term "blower tube" may include both a body portion 113 and an ejector or mixing portion 115 (the latter forming part of a flow ejector as further described below).

The housing 102 may also contain an airflow generator, e.g., an axial fan, radial impeller, source of compressed air, etc. that allows the blower to produce a primary airflow that is exhausted at the air outlet 114. The primary airflow may then be directed through the blower tube 112 to provide a working airflow at the blower outlet 116 (see, e.g., FIG. 1A) as further described below.

As used herein, the term "upstream" refers to a direction or location that is toward the housing 102 (see FIG. 1A), while the term "downstream" refers to a direction or location that is more towards the outlet 116. Moreover, the phrase "removably attach" or the like is used herein to refer to an attachment mechanism or procedure that allows for simple, expedient, and repeatable coupling/decoupling of a first component to/from a second component, preferably without the use of tools. For example, removably attaching a nozzle to a blower tube could occur with a friction fit or a mechanical latch. Such a construction would allow complete removal of the first component (e.g., ejector portion 115) from the second component (e.g., blower tube body portion 113). Other embodiments may, alternatively, hingedly attach the ejector to the blower tube so that the ejector may pivot from an operative position (see, e.g., FIG. 1A) to an inoperative position. In still other embodiments, the ejector may be tethered to the blower tube by a lanyard so that, like the hinge connection, it remains connected to the tube and available even when the ejector/nozzle is not in use.

Figure 1B:
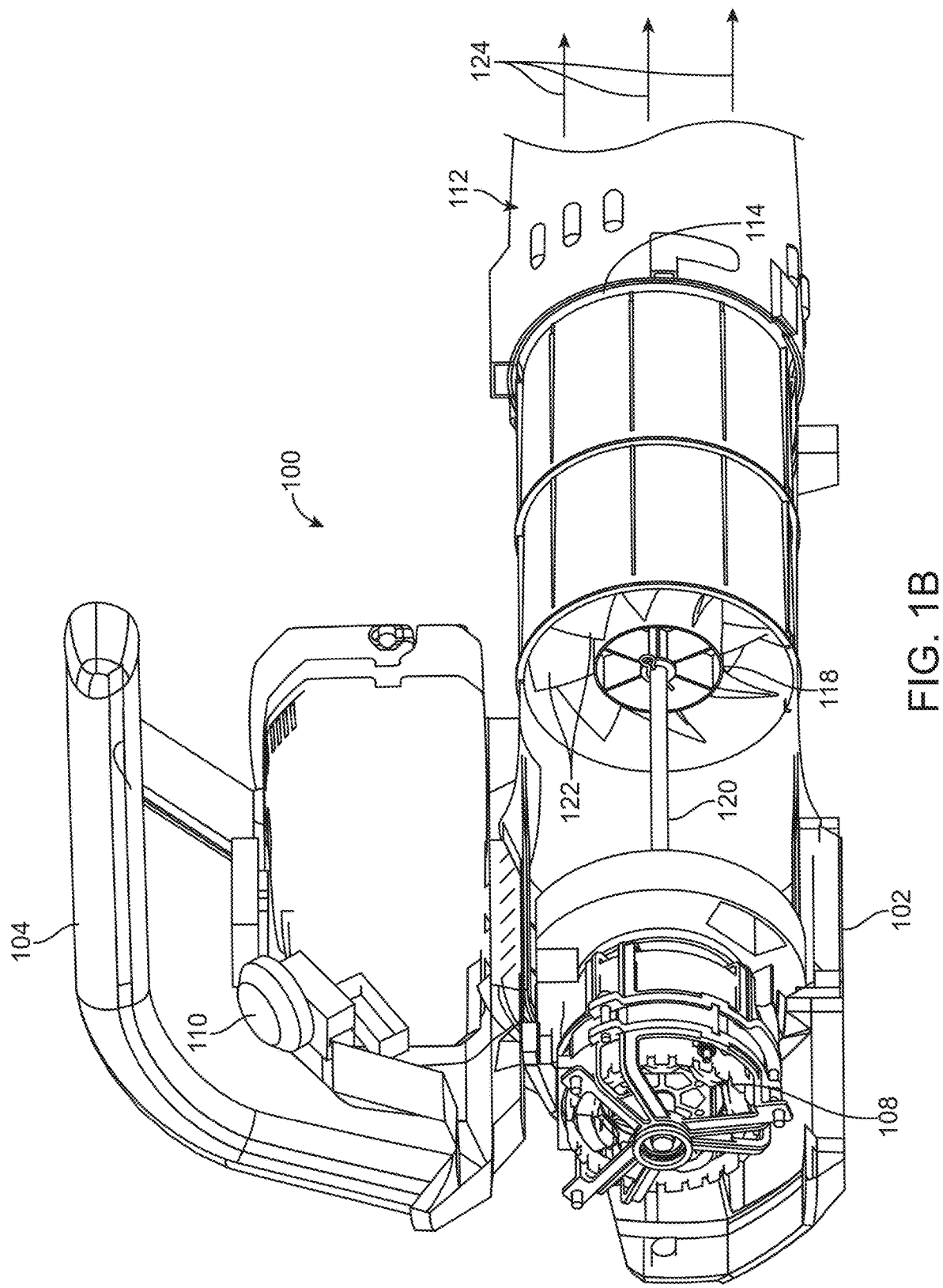
FIG. 1B is a partial cutaway view of the blower of FIG. 1 illustrating an electric motor powering the axial fan.

FIG. 1B illustrates a cutaway view of a portion of the blower 100 of FIG. 1A. As depicted in this view, the housing 102 may be formed from mating plastic (e.g., acrylonitrile butadiene styrene (ABS)) halves that, when assembled, define an interior cavity. The cavity may enclose a power source, e.g., the electric motor 108. The electric motor 108 may be coupled to an axial fan 118 (single- or multi-stage) via a motor output shaft 120.

When electrical power is provided to the motor 108 (e.g., via the cord 106 or battery 107 of FIG. 1A), the output shaft 120, and thus the fan 118, may rotate. As the fan 118 rotates, curved blades or vanes 122 of the fan draw air into the housing via an air inlet 121 (see FIG. 1A). This air may then be accelerated by the fan to produce a primary airflow 124 (see FIG. 1B), the latter exhausted through the air outlet 114 and into the blower tube 112. The blower may thus provide a working airflow 130 exiting the outlet 116 as shown in FIG. 1A.

The blower tube 112 may incorporate the flow ejector 150, embodiments of which are further described below. As stated above, the exemplary ejector 150 may be an integral component of the blower tube 112, or it may be configured as a component that removably attaches to the blower tube (e.g., to the downstream end of the blower tube). As will become clear from the following description, ejectors like the ejector 150 may selectively permit the blower to provide both a high flow, low velocity working airflow 130, or a lower flow, higher velocity working airflow when desired.

Figure 2:
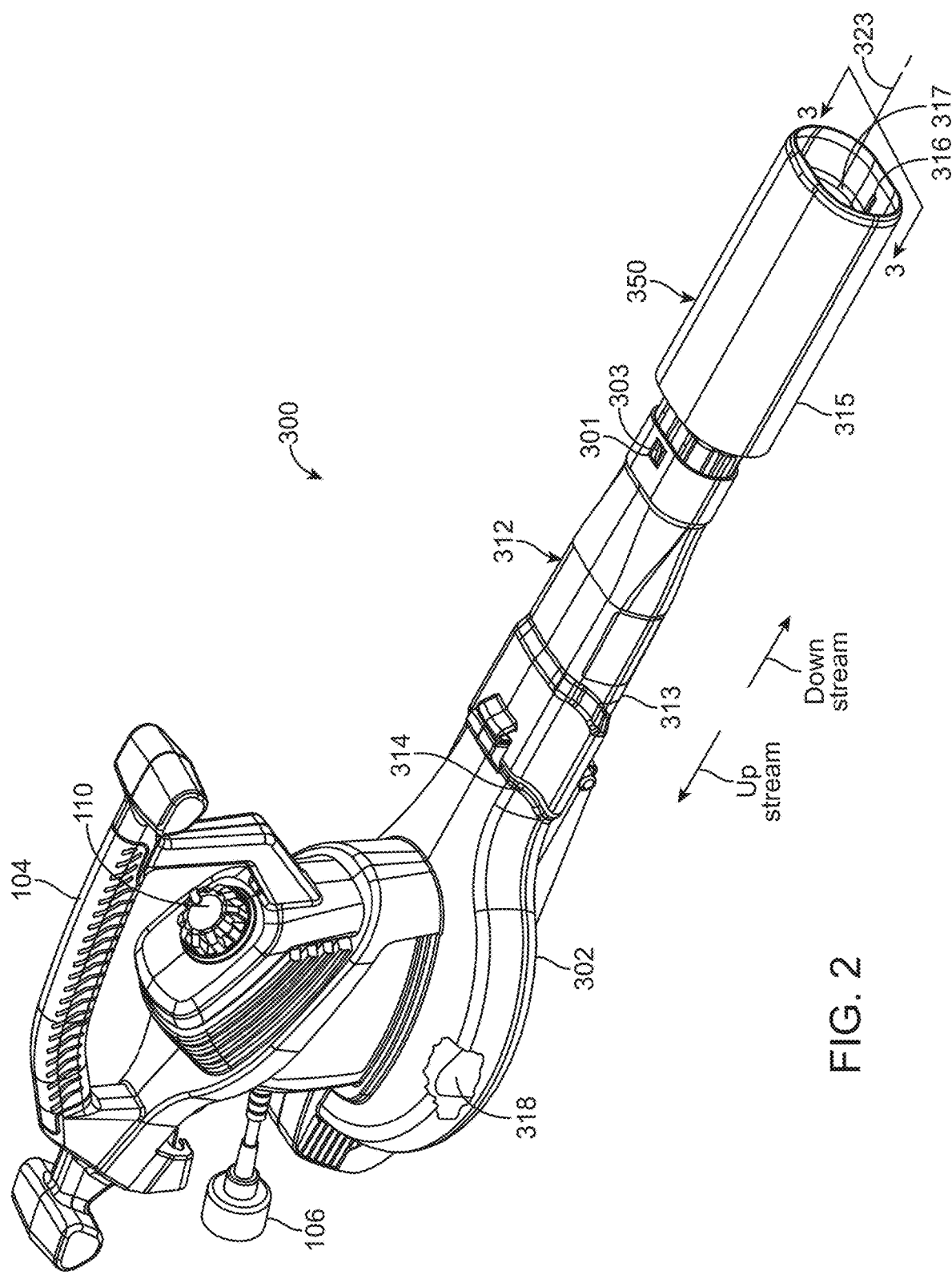
FIG. 2 is a perspective view of a radial impeller debris blower, the blower including a blower tube having a flow ejector near its distal or downstream end in accordance with another embodiment of the present disclosure.

While the embodiment of FIGS. 1A-1B illustrate an axial fan blower having a blower tube of generally round cross section, such a configuration is not limiting. For example, FIG. 2 illustrates a debris blower 300 that utilizes an obround blower tube 312. Moreover, unlike the blower 100 of FIGS. 1A-1B, the blower 300 utilizes a motor (receiving power from an electric cord 106) powering a centrifugal or radial impeller 318 rotating within a plenum of the housing 302, instead of an axial fan, to produce the primary airflow. Centrifugal blowers are beneficial in that they are well-suited to blowers that are convertible to debris vacuums. The general construction of such a debris blower is described in, for example, U.S. Pat. No. 7,735,188. For brevity, exemplary construction of the blower 300 is, therefore, not provided herein. Instead, exemplary blower tube and ejector concepts are presented below.

The blower 300 may include a housing 302 and the blower tube 312 extending outwardly from the housing (the blower 300 may also include a handle 104 and control 110 as described above with respect the blower 100). The blower tube 312 may form an assembly that includes both a body portion 313 and an ejector 350 forming a mixing portion 315 that selectively deploys with actuation of the ejector 350. While the blower tube 312 could be a unitary assembly, the ejector 350 may, in some embodiments, be a separate component that attaches to the body portion 313 (e.g., via an interlocking tab 301/opening 303). As a result, the ejector/mixing portion may optionally be removed from the blower tube when desired, e.g., to attach a conventional nozzle.

Figure 3:
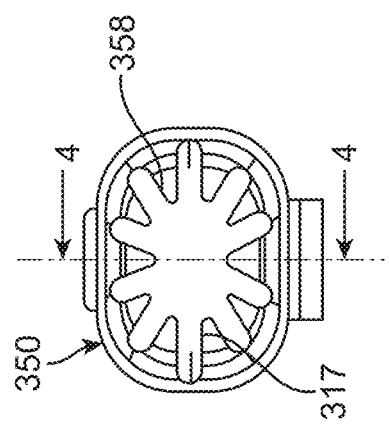
FIG. 3 is an end view (taken along line 3-3 of FIG. 2) of the ejector of FIG. 2 when the ejector is in a closed configuration.
Figure 4:
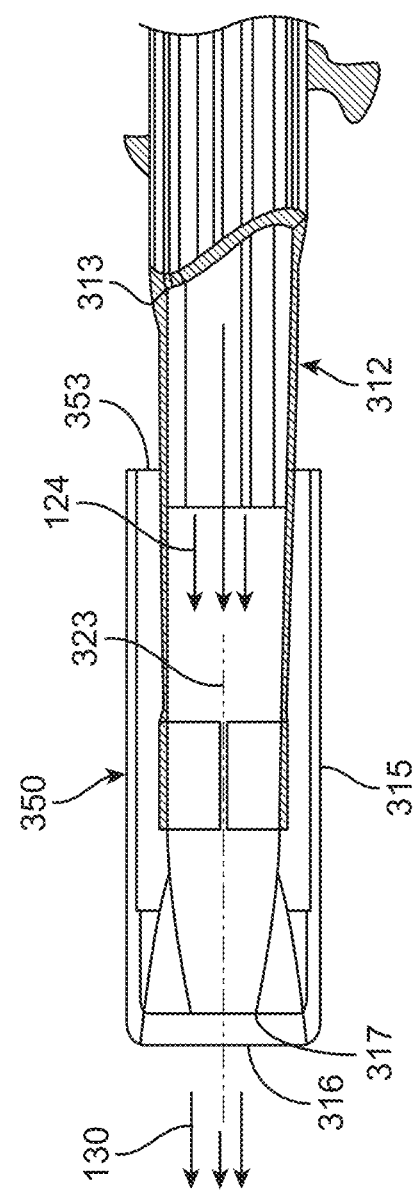
FIG. 4 is a section view taken along line 4-4 of FIG. 3.
Figure 5:
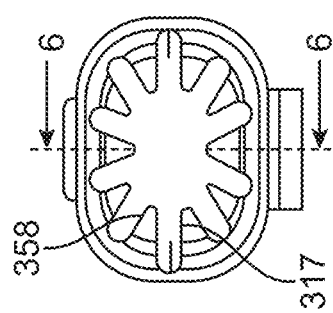
FIG. 5 is an end view (taken along line 3-3 of FIG. 2), but with the ejector shown in an open configuration.
Figure 6:
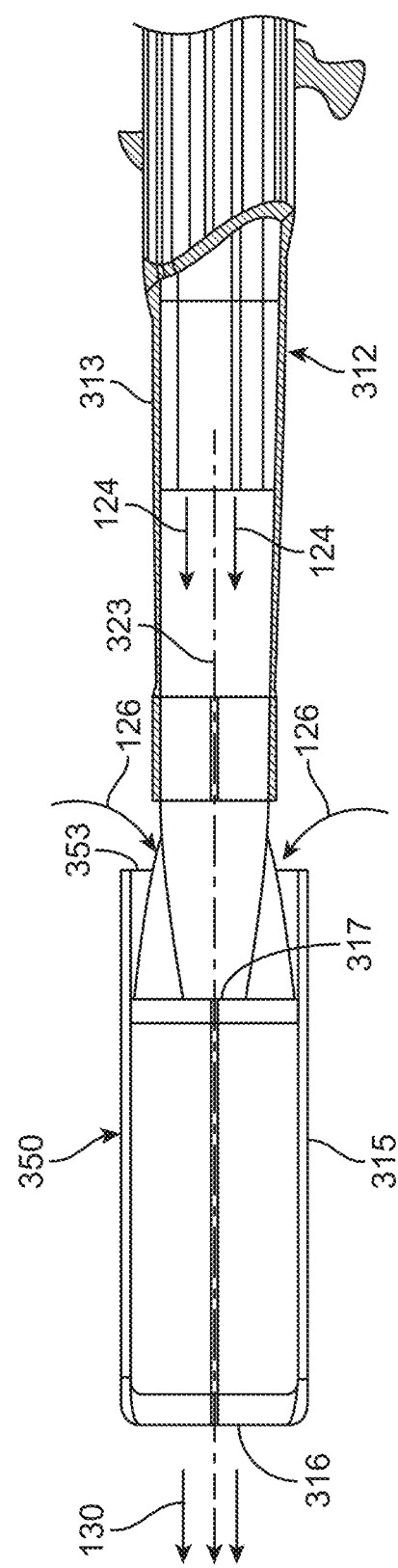
FIG. 6 is a section view taken along line 6-6 of FIG. 5.

FIG. 3 is an end view of the ejector 350 (see line 3-3 in FIG. 2), while FIG. 4 is a section view taken along line 4-4 of FIG. 3. In these figures, the ejector 350 is shown in a closed configuration (ejector off). FIGS. 5-6 are similar to FIGS. 3-4, respectively, but show the ejector 350 in an open configuration (ejector on; note that FIGS. 3 and 5 are the same for either ejector position). As is evident in FIGS. 4 and 6, the ejector 350 may be manipulated between the closed configuration and the open configuration by translating the mixing portion 315 along a longitudinal axis 323 of the blower tube 312 (i.e., in a direction parallel to the primary airflow 124). When the ejector is off as shown in FIG. 4, the primary airflow 124 (airflow generated by the blower impeller) is directed through a primary outlet 317 of the effective body portion 313. A resulting working airflow 130 provided at a blower outlet 316 is thus generally equal to the primary airflow 124 (minus, of course, some losses associated with the blower housing and blower tube).

The ejector 350 may also define one or more flow augmenting inlets 353, located upstream of the blower outlet 316, that are selectively opened or closed by movement of the ejector 350 between the open configuration (ejector on) and closed configuration (ejector off). For example, when the ejector 350 is off as shown in FIGS. 3-4, the flow augmenting inlet 353 is effectively closed. As stated above, in this instance the primary airflow 124 generated by the flow generator (e.g., impeller 318) passes through the blower tube 312 and exits the blower outlet 316, producing a working airflow 130 that is approximately equal to the primary airflow 124.

However, as stated above, the ejector 350 may be reconfigured from the closed configuration to the open configuration. In the embodiments illustrated in FIGS. 2-6, this reconfiguration occurs by manually moving the mixing portion 315 (sliding it downstream along the longitudinal axis 323 of the blower tube) from a closed position (corresponding to the closed configuration of the ejector (i.e., ejector off) as shown in FIG. 4) to an open position (corresponding to the open configuration of the ejector (i.e., ejector on) as shown in FIG. 6).

When the mixing portion 315 is in the open position, the flow augmenting inlet 353 is effectively opened. As a result, the primary airflow 124 within the ejector during blower operation causes reduced pressure within the ejector. This low pressure effectively pulls ambient air ("secondary airflow 126") from outside the ejector through the inlet 353, where it may be mixed or entrained with the primary airflow 124. The result is a working airflow 130 at the blower outlet 316 (which is now positioned downstream of the primary outlet 317) of greater mass than the primary airflow 124.

Embodiments like those described above thus provide an ejector 350 that, when off, provides no mixing portion. Without the mixing portion, the flow augmenting inlet 353 of the ejector 350 is effectively closed and, as a result, a primary outlet 317 formed by the effective blower tube 312 (i.e., the air outlet formed either by an end of the air passage of the body portion 313 or by an end of any effective extension of the primary air passage provided by the ejector (see, e.g., 317 in FIG. 4)) generally forms the blower outlet 316.

While the mass flow rate of the working airflow 130 may increase with the ejector on, kinetic energy transfer from the primary airflow 124 to the secondary airflow 126 does result in a lower velocity of the working airflow 130 (as compared to the ejector off configuration). That is to say, with the ejector 350 off, air pressure at the blower outlet 316 may be high at the expense of reduced airflow rate. Alternatively, with the ejector 350 on, the effective working airflow rate is higher (for the same motor power), but at the expense of lower velocity at the blower outlet 316. Blowers having ejectors in accordance with embodiments of the present disclosure may thus provide a blower having both a high airflow rate setting, while also providing a high air speed setting when desired. These two settings may be provided merely through manipulation (e.g., opening and closing) of the ejector 350 without requiring physically changing blower tubes, nozzles, or engine speed.

To better understand flow augmentation effects as described herein, reference is made to FIGS. 7-10. FIG. 7 illustrates an exemplary blower tube 212 (which may be similar to the blower tube 112 of FIG. 1A) incorporating a simplistic ejector 250 in accordance with embodiments of the present disclosure, while FIG. 9 presents a conventional, tapered nozzle blower tube 12 for comparison. For purposes of this description, the ejector 250 does not include an off position, i.e., the ejector 250 is always on.

FIGS. 8A-8E illustrate various cross-sectional views of the exemplary blower tube 212/ejector 250 at progressive downstream locations as identified in FIG. 7. For example, the cross-sectional shape of the blower tube 212 may be circular (see FIG. 8A) immediately upstream of the ejector, but slowly transition (see FIG. 8B) to a convoluted wall or cross section at or near the primary outlet 217 as shown in FIG. 8C. Downstream of the primary outlet 217, the secondary airflow 126 may mix with the primary airflow 124 in the mixing portion 215 (see FIG. 8D) and the combined working airflow 130 may then exit through the outlet 216 (see FIG. 8E). While shown as having a tapering mixing portion, other embodiments may include constant area mixing portions without departing from the scope of this disclosure.

The mixing portion 215 may connect to the body portion 213 of the blower tube 212 via ribs 160 as shown in FIG. 8C. However, such a configuration is not limiting as the mixing portion could attach to the body portion in most any acceptable manner (e.g., adhesive, fastened, co-molding, etc.).

FIG. 9 and FIGS. 10A-10E, in contrast, illustrate a conventional (i.e., lacking an ejector) round blower tube 12. As shown in these views, the blower tube 12 merely tapers as indicated by the successive cross sections shown in FIGS. 10A, 10B, 10C, 10D, and 10E to develop a high pressure working airflow. However, lacking an ejector in accordance with embodiments of the present disclosure, the blower tube 12 offers no ability to alter blower output without changing the blower tube and/or attaching a separate nozzle. Such tube/nozzle changes may be perceived as inconvenient to the user as, for example, the alternative tube/nozzle is typically not immediately accessible when needed (it is not usually carried during blower operation).

In order to permit the secondary airflow 126 to efficiently entrain or mix with the primary airflow 124, a wall 258 of the blower tube 212 may transition from the smooth, round (or obround) cross-sectional shape upstream of the primary outlet (see FIG. 8A) to a convoluted shape or cross section at the primary outlet (see, e.g., primary outlet 217 in FIG. 8C or wall 358/outlet 317 in FIG. 3). As used herein, "convoluted" refers to any shape of the blower tube wall at the primary outlet that results in effective mixing of the secondary airflow 126 with the primary airflow 124. For example, as illustrated in FIG. 8C, the wall may gradually transition to a circumferentially-extending serpentine wall 258, yielding a generally star-shaped cross section or end view. One such wall geometry is produced by forming a series of tapered flutes in the downstream end of the body portion (see e.g., 213 in FIG. 7). While such flutes are shown as being axial (i.e., being generally parallel to the longitudinal axis of the blower tube 212), other embodiments may utilize helical flutes without departing from the scope of this disclosure.

In still other embodiments, the blower tube wall 258 may form a circumferentially extending sharp-edged or "sawtooth" profile when viewed along an axis of the blower tube. As further described below, the convoluted cross-section/end view of the primary outlet may also be formed by moving members that produce a discontinuous cross-sectional shape when the ejector is in the open configuration.

Accordingly, the actual geometry of the convoluted shape of the ejector may certainly vary without departing from the scope of this disclosure as long as such geometry permits (at least when the ejector is on) entry of air from outside the blower tube (e.g., the secondary airflow 126) to enter and mix effectively with air flowing inside the blower tube (e.g., the primary airflow 124).

Figure 11:
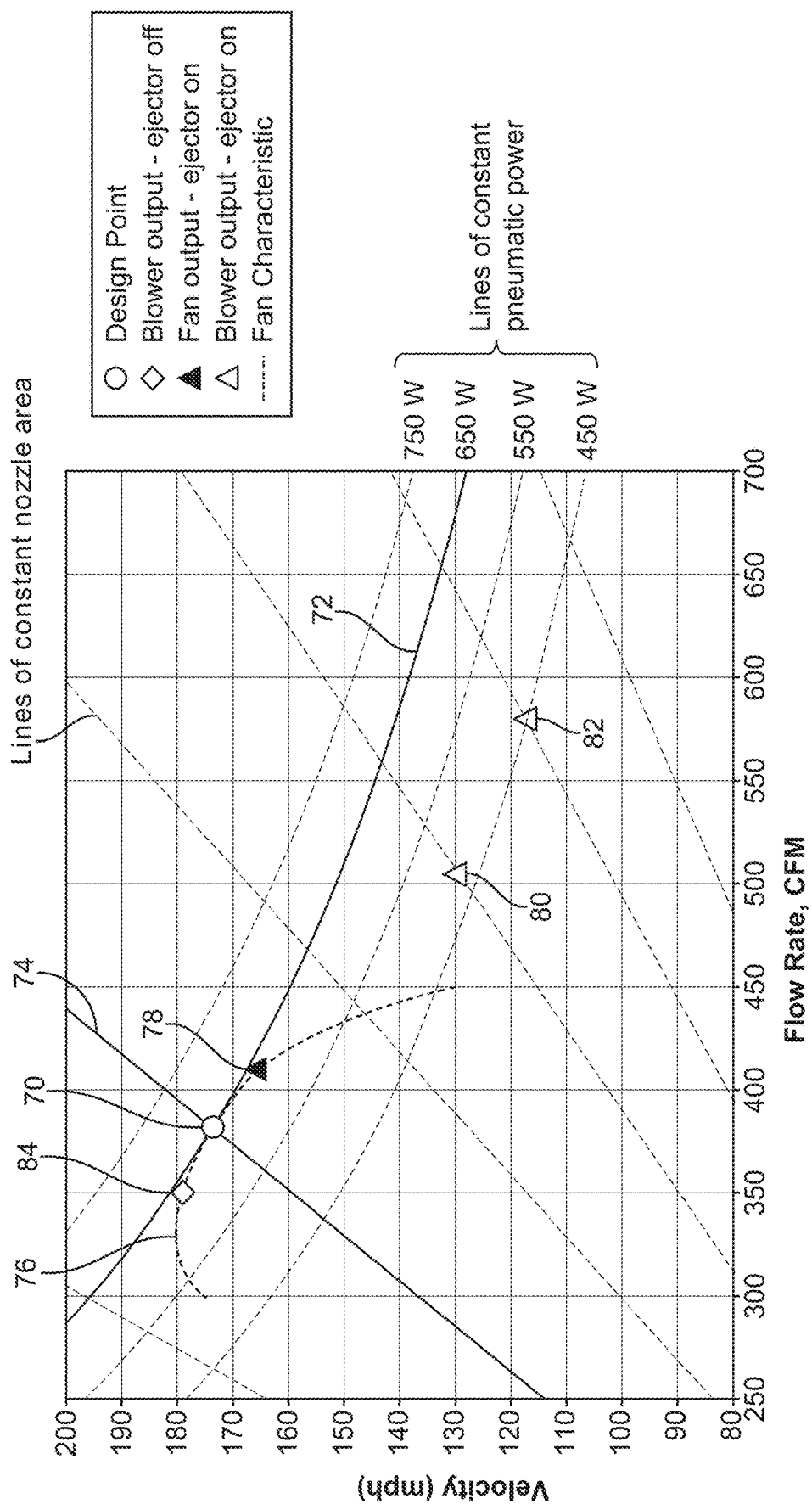
FIG. 11 is a simulated graph of air stream velocity v. flow rate for a blower and ejector constructed in accordance with embodiments of the present disclosure and showing various design considerations.

FIG. 11 illustrates a simulated graph of output airstream velocity (e.g., in miles/hour or MPH on the y-axis) v. airflow rate (e.g., in ft$^3$/min or CFM on the x-axis) with, for example a blower similar to that illustrated in FIGS. 2-6. The x-axis could be replaced by other measures of flow (e.g., volume of air that exits the blower outlet per unit time), or by a mass flow measurement (e.g., mass of air that exits the blower outlet per unit time). Similarly, the y-axis could be replaced by other measures of air velocity or by a measure of the kinetic energy of the flow (e.g., velocity squared or total pressure of the airflow at the blower outlet).

In general, a blower may provide a certain amount of power (e.g., based upon input power received from, e.g., an external electrical power supply, a battery, or a gasoline engine). This input power is converted to shaft power by a motor (resulting in some loss due to inefficiency), and then converted to pneumatic power by a fan or impeller (resulting in yet additional losses). Accordingly, for a given input power to the blower, a reduced maximum pneumatic output power is expected from the fan/impeller. These losses between pneumatic output and power input may, of course, be minimized through optimal motor and fan design.

As one of skill may appreciate, a given motor and fan combination will yield a peak operating efficiency or point (an operating condition where losses are minimized). In FIG. 11, this condition is identified as design point 70. For purposes of description only, the blower exemplified in FIG. 11 may have an input electrical power of 1250 Watts (W), and a pneumatic output power (at the design point) of 650 W. A 650 W pneumatic power curve 72, as well as other lines of constant pneumatic power, are also identified in the plot.

With a known pneumatic output power, the design point can be adjusted (e.g., along the pneumatic power curve) from high velocity (and lower flow) to high flow (and lower velocity) by adjusting blower outlet area. For example, in FIG. 11, a high velocity design point for the 650 W pneumatic power embodiment could be about 380 CFM and 173 MPH, while a high flow design point might be selected at 600 CFM and 138 MPH. In theory, a design point may be selected anywhere along the constant pneumatic power line curve 72. In practice, however, realistic limitations in motor and fan type/size may restrict operation to only a portion of the curve. For purposes of this example, a design point of 380 CFM at 173 MPH was selected as it provides a desirable air speed. It is noted, however, that other embodiments may utilize different criteria to select the design point without departing from the scope of this disclosure.

With the design point selected, the blower outlet or "nozzle" exit area may be determined and fixed at, for example, 3850 square millimeters (mm$^2$), which equates to a 70 millimeter (mm) diameter circular outlet (while described as circular, the actual shape is not limiting). With this fixed outlet area, blower motor speed may be adjusted (by varying input power) to provide performance anywhere along a line 74 representing constant nozzle (i.e., blower outlet) area in FIG. 11. For example, if the input power were reduced in this exemplary blower such that the resulting pneumatic power is effectively equal to 450 W, the operating point of the blower would move to 330 CFM at 154 MPH. While it is theoretically possible to move the operating point to any location along a line of constant nozzle area by adjusting motor power input, there is, in practical application, an upper limit based upon maximum available power and component ratings. Moreover, while less common, there may also be a lower voltage input limit below which a motor may fail to operate smoothly.

For a conventional blower, a change in blower outlet area is obviously required to vary from the line of constant nozzle area. This change is typically achieved through changing the blower tube and/or through attaching a nozzle to the end of the blower tube (see e.g., drop in nozzle described in U.S. Pat. No. 6,003,199) to reduce the blower outlet area. However, variation in blower outlet area is effectively constrained by motor and fan characteristics. For instance, as blower outlet area is reduced, fan loading may increase and rotational speed and efficiency may drop. At some point, stall may occur. Conversely, as blower outlet area increases, speed may increase and efficiency may again drop such that, at some point, maximum flow rate is reached. Moreover, in both of these instances, blower noise may increase to a point beyond acceptable levels.

However, it has been discovered that, if a blower outlet of variable size can be utilized, it is possible to provide a blower that can move between high velocity and high flow operating points without changing the motor/fan combination and without physically changing blower tubes/nozzles. For example, an exemplary blower (e.g., blower 300) with variable blower outlet area may be able to move along curve 76 (identified in FIG. 11 as the "fan characteristic"). As illustrated by this curve, reducing blower outlet area may increase output airstream velocity. However, at some point, efficiency losses increase and lead to a plateau and ultimately, stall may occur. Conversely, increasing blower outlet area may increase flow rate as shown but velocity may drop rapidly due to efficiency losses. Of course, the range of possible operation (i.e., the range of blower outlet areas with which a typical blower may function) can be augmented through changes in fan design. However, this is often at the expense of design point efficiency.

Accordingly, a blower having adjustable blower outlet area may provide increased productivity by allowing adjustment of blower output airflow and output velocity beyond that typically available with constant blower outlet sizes. Unfortunately, the benefits gained from varying blower outlet area may be minimal due to efficiency losses.

The inventors have found, however, that by applying ejector concepts as described herein, a high velocity and a high flow operating point can be provided by the same blower without the need to change blower tubes and/or nozzles. That is to say, by incorporating an ejector in accordance with embodiments of the present disclosure, a blower can provide: an "ejector off" design point that is at or near a desired high velocity performance condition; and an "ejector on" design point that is at or near a desired high mass airflow performance condition.

Ejectors in accordance with embodiments of the present disclosure may achieve these apparent opposing goals by using the high velocity primary airflow (from the fan/impeller) to entrain the secondary airflow from the surrounding environment. In some embodiments, a mixing portion (e.g., the mixing portion 350) of generally constant cross section is used to mix the two flows (where mixing drives the entrainment process) and this mixed (now at a higher flow rate but lower velocity than the primary flow) airstream then exits the ejector at the blower outlet 316.

Because the blower outlet area effectively "seen" by the fan/impeller is generally unchanged between ejector on and off conditions, the fan continues to operate at or near the design point. In practice, static pressure at the blower outlet may reduce slightly due to ejection and, as a result, airflow from the fan may increase slightly. However, the blower outlet effective area (the area effectively "seen" by the fan) may, in some of the embodiments described herein, slightly increase (from a first area to a second area) as the ejector is actuated. This may effectively increase flow rate through the fan (along the fan characteristic curve 76 in FIG. 11) without sacrificing efficient operation. The change in fan pneumatic output power for the exemplary ejector being on is labelled in FIG. 11 as 78 ("Fan output—ejector on").

The primary airflow (e.g., 124) generated by the fan/impeller may mix with the secondary airflow (e.g., 126) to produce the augmented working airflow (e.g., 130). In the exemplary plot of FIG. 11, two different embodiments are illustrated and identified as data points 80 and 82 ("Blower output—ejector on"). The lower flow point 80 utilizes an ejector outlet diameter of 80 mm, while the higher flow point 82 utilizes an ejector outlet diameter of 90 mm. In both cases, the pneumatic power (relative to the fan output power) is reduced as the mixing process inherently produces losses. However, as one of skill in the art can see, the output at these two points—compared to the output available from the fan (i.e., along the "fan characteristic" curve in FIG. 11)—clearly indicates that substantially higher flow rates can be achieved. Moreover, embodiments like those described herein can again provide such benefits without the need to exchange blower tubes and/or nozzles.

While providing the high flow "ejector on" flow output, embodiments like those described herein and shown in FIG. 11 may also provide an "ejector off" blower outlet area (area effectively seen by the fan) that is slightly reduced relative to that determined for maximum efficiency. This may increase the operating range of the blower by moving a high velocity operating point 84 (indicated in FIG. 11 as "Blower output—ejector off") slightly higher. Moreover, with the ejector either on or off, the output of the blower can be moved along a line of constant nozzle area merely by adjusting power to the fan (e.g., by varying voltage to the motor). Accordingly, embodiments like those described herein may use ejection, as well as slightly altering the nozzle exit area seen by the fan, to produce a blower with a substantially larger operating range compared to that available without ejection.

The exemplary ejector 350 achieves effective mixing of the primary airflow with the secondary airflow by providing a wall (e.g., wall 358) at the primary outlet 317 with a convoluted shape (e.g., serpentine) as shown in FIGS. 3 and 4. While not illustrated in the figures, the mixing portion 315 and/or parts of the primary outlet 317 may include protrusions into the primary and/or secondary airflow that assist with maximizing mixing of the primary and secondary airflows. In some embodiments, such protrusions retract when the ejector is in the off configuration to, for example, reduce frictional losses. Such retraction could happen automatically as the mixing portion is retracted, or could occur via a separate operator action. Such embodiments are further described below.

While illustrated in conjunction with an obround blower tube and ejector, those of skill in the art will recognize that the blower tube 312/ejector 350 may be easily modified to accommodate a blower tube of round cross section as shown in, for example, FIGS. 12-13. In fact, most any blower tube shape can be accommodated within the scope of this disclosure.

Still further, depending on the degree of flow augmentation desired and the need to maintain acceptable "ejector off" performance, the actual mixing geometry of the augmenting inlet 353/primary outlet 317 may be configured in most any manner. Various alternative embodiments for shape, size, and number of secondary airflow passages (extending from the augmenting inlet into the primary blower tube airflow) are illustrated in FIGS. 14A-14F. For example, serpentine passages, similar to those already described herein but of different sizes and shapes, are shown in FIGS. 14A, 14D, 14E, and 14F. Alternatively, passageways that maintain the primary outlet 317 shape (e.g., for minimizing flow interference when the ejector is off) are shown in FIGS. 14B and 14C. Again, these ejector geometries are illustrative only and other embodiments are certainly possible without departing from the scope of this disclosure.

Embodiments like those shown in FIGS. 14B and 14C are desirable because they minimize flow interference when the ejector is off by maintaining a smooth, continuous blower outlet. However, such configurations may not perform as well as those having convoluted primary outlets when the ejector is on due to their lessened ability to effectively mix the primary and secondary airflows. FIGS. 15-22 illustrate alternative embodiments of a blower tube and ejector that seek to combine the benefits of a smooth continuous outlet when the ejector is off, while still providing a convoluted primary outlet when the ejector is on.

Figure 15:
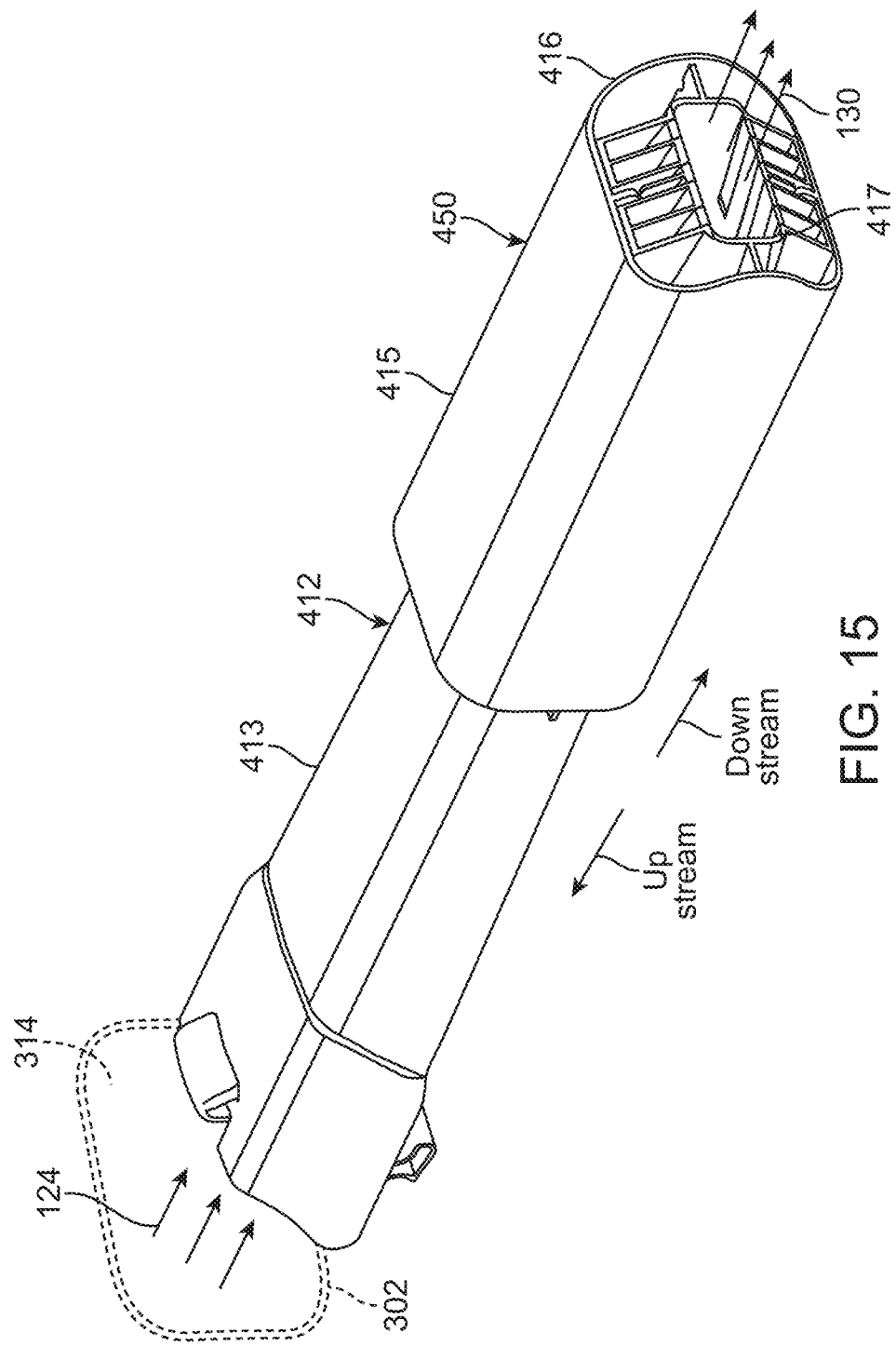
FIG. 15 is a perspective view of a blower tube and flow ejector in accordance with another embodiment of the present disclosure, the ejector shown in a closed configuration.
Figure 16:
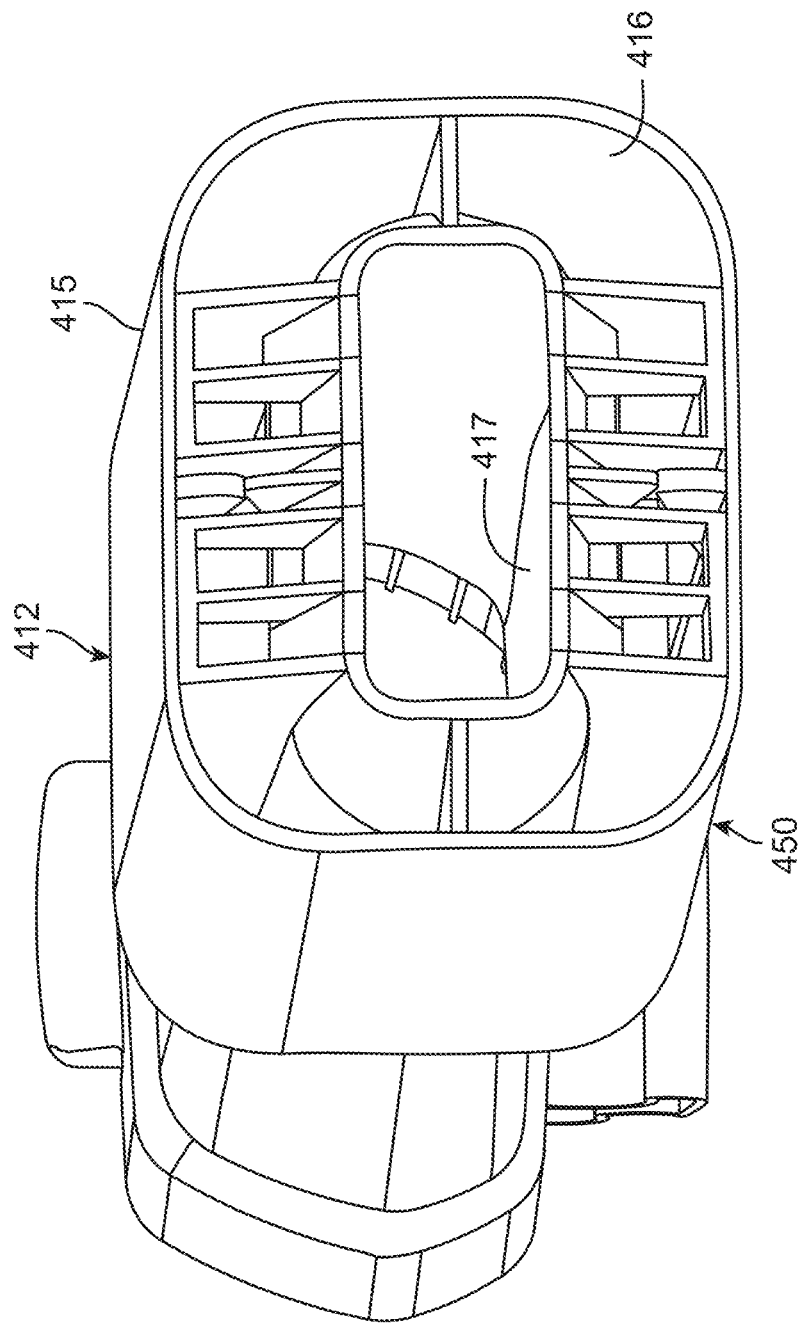
FIG. 16 is an enlarged perspective view of a distal end of the blower tube and ejector of FIG. 15.

As shown in FIG. 15, an exemplary blower tube 412 (which may be connected to, for example, an air outlet 314 of the blower housing 302 of FIG. 2) is provided that includes a body portion 413 and an ejector 450 that, when in the open configuration (see FIG. 17), forms a mixing portion 415. As visible in FIGS. 15 and 16, when the ejector is in the off configuration or position, the mixing portion 415 is retracted such that the primary outlet 417 generally forms the blower outlet 416. Accordingly, secondary airflow introduction to the blower tube is substantially reduced or eliminated, yielding a working airflow 130 approximately equal to the primary airflow 124. Moreover, as shown in FIG. 16, the ejector 450 may yield a primary air outlet 417 that is similar to the obround blower tube outlet on a conventional debris blower. That is, it is relatively smooth and continuous (e.g., not convoluted). As a result, frictional losses may be minimized when the ejector 450 is off.

Figure 17:
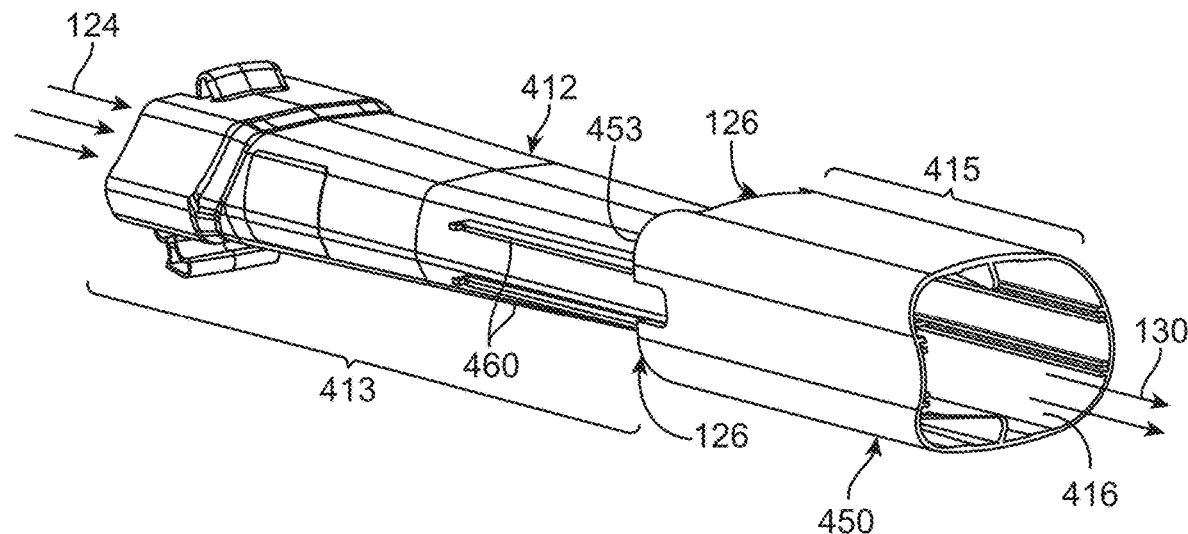
FIG. 17 is a perspective view of the blower tube and ejector of FIG. 15, but with the ejector shown in an open configuration.
Figure 18:
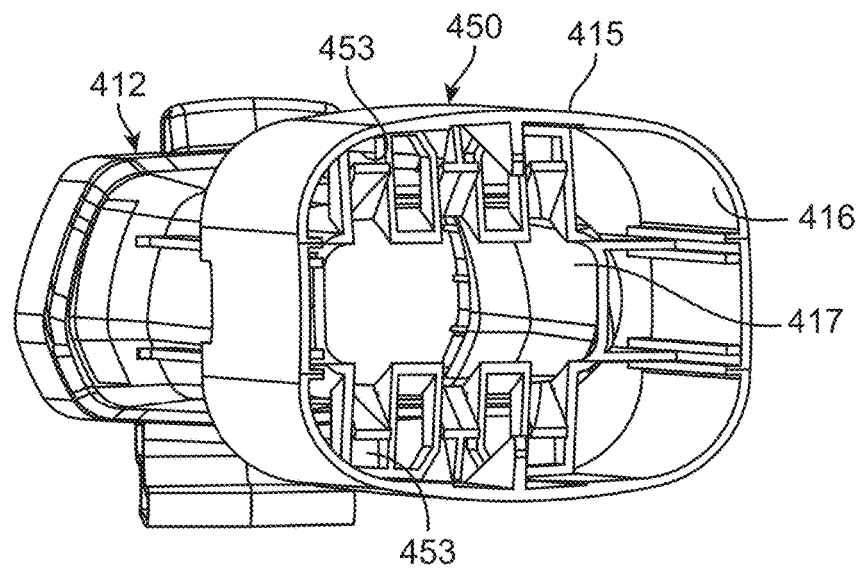
FIG. 18 is an enlarged perspective view of a distal end of the blower tube and ejector of FIG. 17.

However, when the ejector 450 is slid downstream to the open configuration or position as shown in FIGS. 17 and 18, the mixing portion 415 deploys as shown such that the blower outlet 416 is now downstream from the primary outlet 417. With the deployment of the mixing portion 415, one or more flow augmenting inlets 453 may then permit the entry of the ambient, secondary airflow 126 into the mixing portion 415, where it may mix with the primary airflow 124 to produce the working airflow 130. To support the mixing portion 415 as it moves between the on and off configurations, the body portion 413 of the blower tube 412 may include elongate guides 460 as shown.

As stated above, it is desirable to provide a smooth and continuous primary outlet 417 when the ejector 450 is off, while also providing a convoluted primary outlet shape when the ejector is on. Accordingly, the ejector 450 may provide deployable fingers as perhaps best illustrated in the cut-away views of FIG. 19 (ejector off) and FIG. 20 (ejector on). As shown in these views, an inner surface of the mixing portion may include two radially opposing cam surfaces 470 (see also FIG. 21) that extend inward toward the blower axis. In the illustrated embodiment, each of these cam surfaces 470 interacts with a corresponding tab 471 formed on a gate 472, wherein the gate is movably attached to the main portion 413 of the blower tube. Each gate may be located between the primary airflow (within the blower tube) and the flow augmenting inlets 453.

Figure 19:
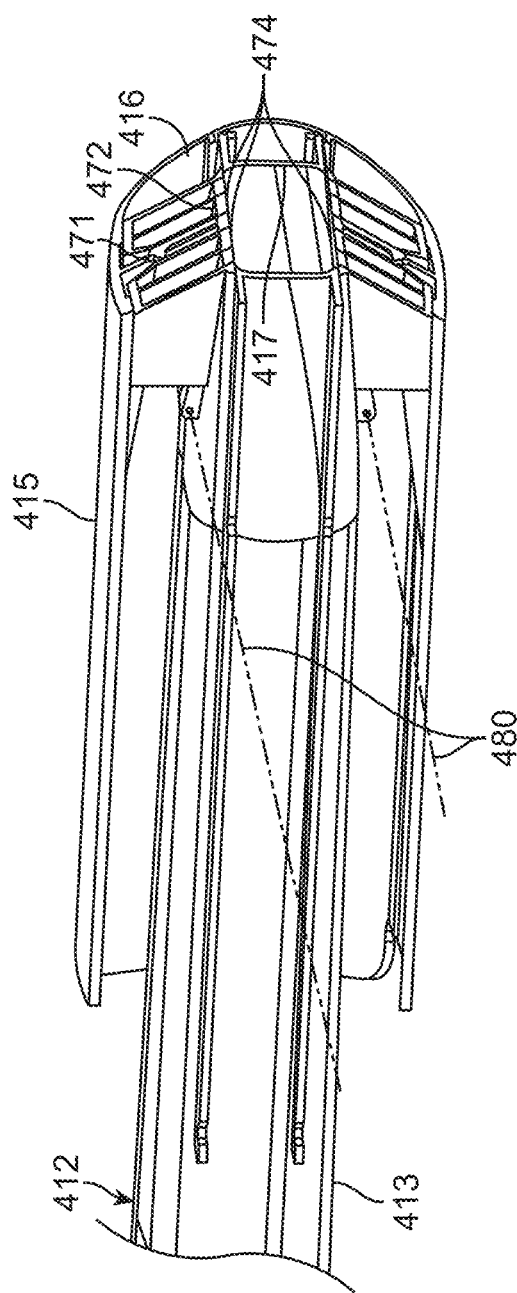
FIG. 19 is an enlarge cutaway view of the blower tube and ejector of FIG. 15 (with the ejector in the closed configuration)
Figure 20:
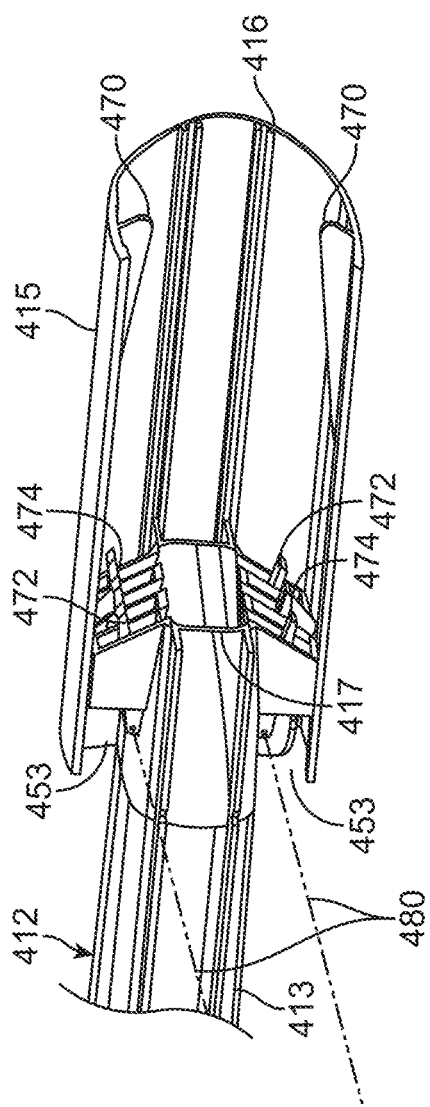
FIG. 20 is an enlarge cutaway view of the blower tube and ejector of FIG. 17 (with the ejector shown in the open configuration)
Figure 22:
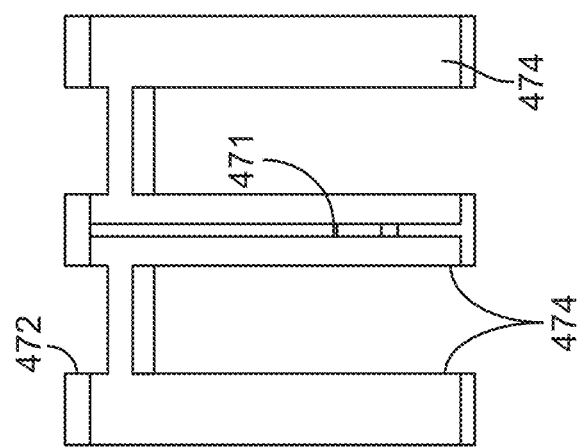
FIG. 22 is an isolated top plan view of an exemplary gate for use with the blower tube and ejector of FIGS. 15-20.
Figure 21:
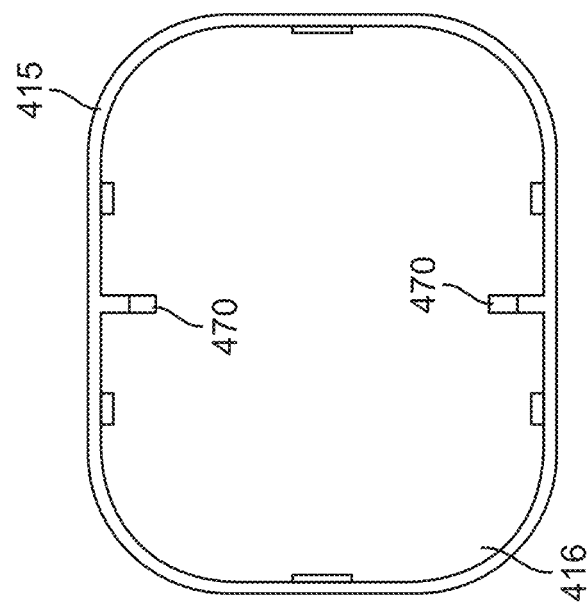
FIG. 21 is an isolated end view of a mixing portion of the blower tube of FIGS. 15-20.

In some embodiments, each gate 472 may pivot, relative to the blower tube 412, about a pivot axis 480 that is transverse to the longitudinal axis of the blower tube (the gate 472 is shown in isolation in FIG. 22). For instance, each gate 472 may pivot between a closed position (see FIG. 19) and an open position (see FIG. 20). When the ejector is off, each gate 472 is immobilized in the closed position by contact between the tab 471 and the associated cam surface 470. Moreover, each gate 472 may include one or more fingers, and each finger may define one or more gate surfaces 474. When the gate is in the closed position, these gate surfaces are held flush with an inner surface of the blower tube as shown in FIG. 19 to provide a smooth, continuous shape at the primary outlet 417.

However, when the ejector is on (see FIG. 20), the cam surfaces 470 move out of engagement with the associated tabs 471. Thus, pressure within the blower tube (from the primary airflow) causes each gate 472 to pivot from the closed position (FIG. 19) to the open position (FIG. 20) about its respective pivot axis 480. As this gate movement occurs, the gate surfaces 474 move from a position corresponding to/flush with the smooth continuous primary outlet 417 (see FIG. 19), to a position providing the primary outlet 417 with the desired convoluted discontinuous shape (see FIG. 20) beneficial to airflow mixing. Gate deployment may also provide an increase in the effective primary outlet area (which is, again, the area "seen" by the fan), thereby potentially improving blower performance as already described herein.

Accordingly, the blower tube 412/ejector 450 may provide the benefits of a flow ejector as already described herein, while still providing the relatively smooth primary outlet desirable for operation with the ejector off.

While illustrated and described herein as merely providing discrete on and off ejector settings, those of skill in the art will realize that blower tubes/ejectors in accordance with embodiments of the present disclosure could provide additional, e.g., infinite adjustability, between the "on" and "off" settings to provide yet additional air speed/flow rate settings. Such a configuration would need to provide sufficient secondary airflow and mixing length properties to achieve the desired flow variation (see discussion above regarding FIG. 11).

Still other embodiments are contemplated. For instance, a blower tube and or nozzle that is not adjustable (i.e., is always on) as shown in, for example, FIG. 7 may be provided and attached to the blower tube when higher mass airflow is desired.

Figure 23A:
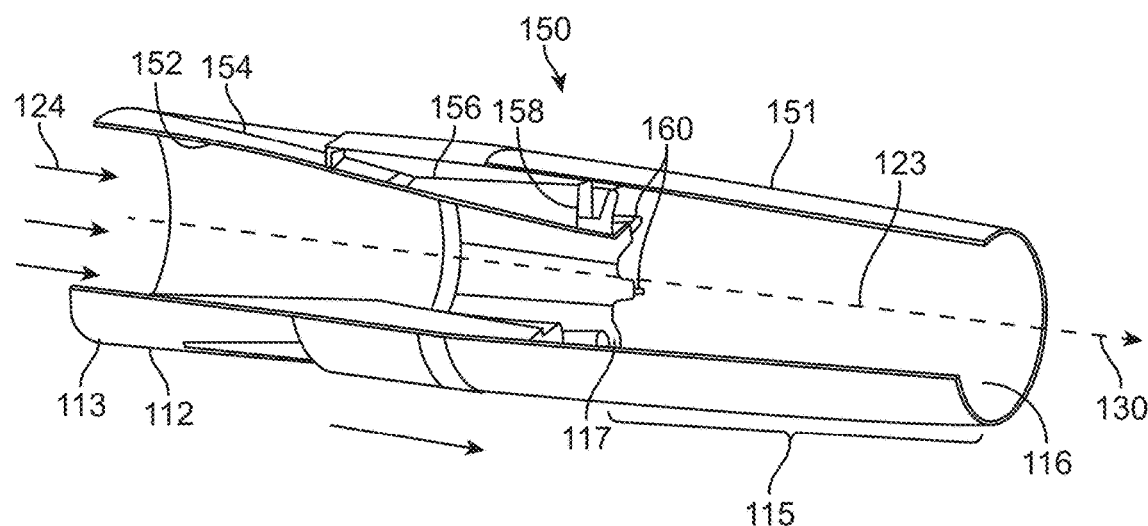
Figure 23B:
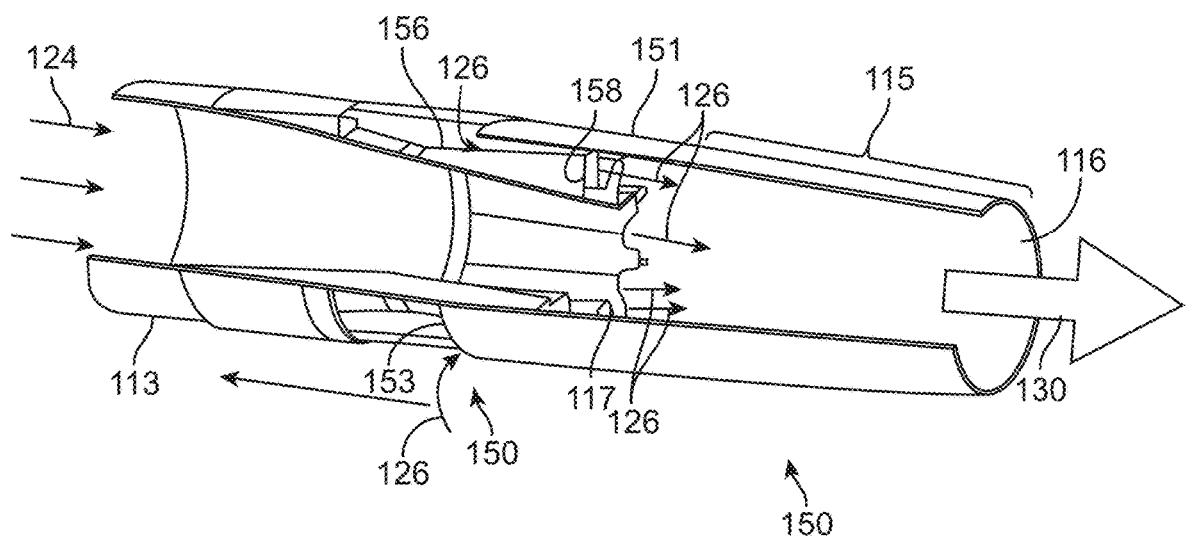

Still further, as opposed to providing an ejector that is slidable or translatable along the blower tube between off and on positions, other embodiments may achieve actuation in a different manner. For example, FIGS. 23A and 23B illustrate partial cutaway views of the exemplary ejector 150 in accordance with another embodiment of the disclosure (FIG. 23A illustrates the ejector 150 in a closed configuration, while FIG. 23B illustrates the ejector in an open configuration). To provide these two configurations, the ejector 150 may include a sleeve or ring 151 that translates or slides along the blower tube 112 (i.e., in a direction parallel to a longitudinal axis 123 of the blower tube) between: a closed position (corresponding to the closed (ejector off) configuration of the ejector) as shown in FIG. 23A; and an open position (corresponding to the open (ejector on) configuration of the ejector) as shown in FIG. 23B. While shown as using a sliding ring, yet other embodiments may use a rotating member to achieve manipulation between ejector off and on settings.

To provide the desired flow augmenting inlets, the ejector 150 may include a blower tube having inner and outer surfaces 152, 154 that taper as shown in FIG. 23A. Such a construction may produce a depressed circumferential area 156 on the outer surface 154 of the blower tube that permits air entry around most or all the circumference of the blower tube 112 when the ejector is on via the inlets 153. The mixing portion 115 may be attached to the body portion 113 of the blower tube 112 via ribs 160 extending between the undulating serpentine wall 158 and an inner surface of the mixing portion.

Downstream from this depressed circumferential area 156, the primary airflow 124 may exit the body portion 113 (e.g., at a primary outlet 117) and begin to mix with the secondary airflow 126 (assuming the ejector is on). The combined airflow then enters the mixing portion 115. As further described below, a length and geometry of the mixing portion 115 may be selected to ensure that the primary airflow 124 mixes effectively with the secondary airflow 126 to produce the working airflow 130 at the blower outlet 116.

While effective, embodiments like that shown in FIGS. 23A-23B may not perform as well as other embodiments described herein when the ejector is off (i.e., the ejector 150 may not yield the desired airstream velocity when off). This is at least partially attributable to the blower outlet area 116 not effectively changing between ejector on and ejector off conditions. This may limit the fan/impeller's ability to maintain efficiency between the two ejector settings.

Still further, the embodiments described herein illustrate the ejector as being associated with the blower tube (e.g., located at or near the blower outlet (or even defining the blower outlet). Such a construction is, however, not limiting as other embodiments may position the ejector at most any location downstream of the fan/impeller. For example, the ejector could be located at an upstream end of the blower tube, or even associated with/located within the blower housing without departing from the scope of this disclosure. Yet further, the location of the augmenting inlets (see, e.g., 353 in FIG. 6) relative to the primary outlet (e.g., 317 in FIG. 6) may be altered without departing from the scope of this disclosure. For example, the augmenting inlets could be generally at the same axial location along the blower tube as the primary outlet, or even downstream from the primary outlet. Moreover, while the cross sectional inner area of the mixing portion of the ejector is shown in several embodiments as being generally constant along the length of the mixing portion, such a construction is not limiting as other embodiments may vary this inner area with minimal performance impact to the blower.

The complete disclosures of the patents, patent documents, and publications cited herein are incorporated by reference in their entirety as if each were individually incorporated. In the event that any inconsistency exists between the disclosure of the present application and the disclosure(s) of any document incorporated herein by reference, the disclosure of the present application shall govern.

Illustrative embodiments are described and reference has been made to possible variations of the same. These and other variations, combinations, and modifications will be apparent to those skilled in the art, and it should be understood that the claims are not limited to the illustrative embodiments set forth herein.

What is claimed is:

1. A handheld lawn debris blower comprising:
a housing defining an air outlet, wherein the housing is adapted to produce a primary airflow at the air outlet;
a blower tube comprising an upstream end coupled to the air outlet, and a downstream end, the downstream end defining a blower outlet adapted to deliver a working airflow; and
an ejector associated with the blower tube or the housing, the ejector defining a flow augmenting inlet, wherein the ejector is adapted to move between:
a closed configuration, wherein the flow augmenting inlet is effectively closed such that the working airflow is approximately equal to the primary airflow; and
an open configuration, wherein the flow augmenting inlet is open such that a secondary airflow is introduced into the ejector, via the augmenting inlet, and mixed with the primary airflow to effectively increase the working airflow;
wherein the flow augmenting inlet is defined by a gate pivotally attached to the blower tube, the gate movable between:
a closed position when the ejector is in the closed configuration; and
an open position when the ejector is in the open configuration;
and wherein the gate comprises one or more gate surfaces that are, when the gate is in the closed position, flush with an inner surface of the blower tube.

2. The blower of claim 1, wherein the ejector is integral with the blower tube.

3. The blower of claim 1, wherein the ejector comprises a mixing portion translatable along an axis of the blower tube.

4. The blower of claim 1, further comprising changing an effective area of the blower outlet as the ejector moves between the closed configuration and the open configuration.

5. The blower of claim 1, further comprising an axial fan contained within the housing and adapted to generate the primary airflow.

6. The blower of claim 1, wherein the ejector further comprises a mixing portion, and wherein a body portion of the blower tube comprises a primary outlet forming a convoluted wall, the convoluted wall positioned upstream of the mixing portion when the ejector is in the open configuration.

7. A handheld lawn debris blower comprising:
a housing defining an air outlet;
an airflow generator adapted to produce a primary airflow that is exhausted through the air outlet;
a blower tube comprising an upstream end coupled to the air outlet, and a blower outlet formed at a downstream end, wherein the blower provides a working airflow at the blower outlet;
an ejector at or near the downstream end of the blower tube, wherein the ejector comprises a mixing portion movable between: a closed position, wherein a flow augmenting inlet associated with the ejector is effectively closed such that the working airflow is approximately equal to the primary airflow; and an open position, wherein the flow augmenting inlet is effectively open such that a secondary airflow is introduced into the ejector, via the flow augmenting inlet, and mixed with the primary airflow such that the working airflow is greater than the primary airflow;
wherein the flow augmenting inlet is defined by a gate pivotally attached to the blower tube, the gate movable between:
a first position corresponding to the mixing portion being in the closed position; and
a second position corresponding to the mixing portion being in the open position;
and wherein the gate comprises one or more gate surfaces that are, when the gate is in the first position, flush with an inner surface of the blower tube.

8. The blower of claim 7, wherein the airflow generator comprises an axial fan.

9. The blower of claim 7, wherein the airflow generator comprises a radial impeller.

10. A handheld lawn debris blower comprising:
a housing defining an air outlet, wherein the housing is adapted to produce a primary airflow at the air outlet;
a blower tube comprising an upstream end coupled to the air outlet, and a downstream end, the downstream end defining a blower outlet adapted to deliver a working airflow; and
an ejector associated with the blower tube or the housing, wherein the ejector is adapted to move between:
a closed configuration, wherein the blower outlet defines a first area; and
an open configuration, wherein the blower outlet defines a second area different that the first area;
and wherein the ejector defines a flow augmenting inlet formed by a gate pivotally attached to the blower tube, the gate movable between:
a closed position when the ejector is in the closed configuration; and
an open position when the ejector is in the open configuration;
and wherein the gate comprises one or more gate surfaces that are, when the gate is in the closed position, flush with an inner surface of the blower tube.

* * * * *